US008875057B2

(12) United States Patent
Robertson-Hodder

(10) Patent No.: US 8,875,057 B2
(45) Date of Patent: Oct. 28, 2014

(54) DOCUMENT MANAGEMENT FRAMEWORK

(75) Inventor: Aaron Desmond Robertson-Hodder, Concord West (AU)

(73) Assignee: Macroview Business Technology Pty Limited, Sydney, New South Wales (AU)

( * ) Notice: Subject to any disclaimer, the term of this patent is extended or adjusted under 35 U.S.C. 154(b) by 587 days.

(21) Appl. No.: 12/869,710

(22) Filed: Aug. 26, 2010

(65) Prior Publication Data

US 2012/0054636 A1 Mar. 1, 2012

(51) Int. Cl.
*G06F 3/00* (2006.01)
*G06F 17/30* (2006.01)

(52) U.S. Cl.
CPC ............................. *G06F 17/30011* (2013.01)
USPC ........................... 715/853; 715/854; 715/864

(58) Field of Classification Search
USPC .......................................... 715/853, 854, 864
See application file for complete search history.

(56) References Cited

U.S. PATENT DOCUMENTS

2007/0220019 A1* 9/2007 Zhiyanov et al. ............. 707/100

OTHER PUBLICATIONS

World Intellectual Property Organization Publication WO 2007/137323. Rodenbach et al. Filing date May 21, 2007.*

* cited by examiner

*Primary Examiner* — Michael Roswell
(74) *Attorney, Agent, or Firm* — Ladas & Parry, LLP

(57) ABSTRACT

Disclosed is a method, in a system (FIG. 5) comprising a user computer (509) (509) and a SharePoint server (506) (506), of enabling, using Outlook (514) running on the user computer (509), document management of files stored by the SharePoint server (506). The method comprises executing (1001) Outlook (514) (514) on the user computer (509) thereby creating an Outlook display window, invoking (1002), using a DMF client application (511) (511) running on the user computer (509), a software application (512) (512) (509) to create a DMF pane (516) (101) in the Outlook display window (102), and then retrieving displaying and updating a displayed tree view of the user's SharePoint environment, either from a DMF client side cache (510) (510) (509) or, if the DMF client side cache (510) is unavailable, from a DMF web service application (507) (507) running on the SharePoint server (506).

10 Claims, 14 Drawing Sheets

DOCUMENT MANAGEMENT FRAMEWORK

TECHNICAL FIELD OF THE INVENTION

The present invention relates generally to computer-based document management systems, and in particular, to systems based upon Microsoft® SharePoint® (hereinafter referred to as SharePoint) and Microsoft® Outlook® (hereinafter referred to as Outlook). The present invention also relates to a method and apparatus for providing enhanced document management functionality integration and improved user interface capabilities for SharePoint when using Outlook as a front end.

BACKGROUND

Outlook is a software application typically used as a personal information manager. Outlook is used as an e-mail application, and for other purposes such as note taking and calendaring. SharePoint is a software application typically running on a server farm, which can be used for multi-user collaboration and access to stored documents. Users often access SharePoint using Outlook as a front end.

SharePoint has some document management capabilities which can be effected using a web browser as described below, and can store many types of documents, along with metadata for those documents. A user can search for documents stored in SharePoint using a web browser, based on the content and/or metadata associated with the stored document.

A SharePoint document store is organised into a hierarchical tree of 'containers' in a similar manner to that used in Outlook. There are some differences in terminology, e.g. in a SharePoint web application, a 'document library' is the nearest equivalent to a 'folder' in Outlook, these document libraries are located in 'Sites', and Sites are arranged into 'Site Collections'.

As noted above, SharePoint can be accessed using a web browser, and the user interface that is generated using this approach is referred to in this description as the "native SharePoint" user interface. The document management functionality provided by this native SharePoint user interface suffers from significant limitations.

SharePoint can alternately be accessed using Outlook as a front end, and the user interface that is generated using this approach is referred to in this description as the "native Outlook/SharePoint" user interface. The document management functionality provided by this native Outlook/SharePoint user interface also leaves much to be desired.

SUMMARY

It is an object of the present invention to substantially overcome, or at least ameliorate, one or more disadvantages of existing arrangements. Disclosed are arrangements, referred to as Document Management Framework (DMF) arrangements, which seek to address the above problems by providing a user with an accessible and editable view of all documents to which a user has permission in a SharePoint web application, through use of Server-side pre-processing and caching, Client-side caching, Server-side filtering and searching, filtered, choked display of the file list, and use of efficient custom web service software applications.

According to a first aspect of the present invention, there is provided a method, in a system comprising a user computer and a SharePoint server communicating over a network, of enabling, using Outlook running on the user computer, document management of files stored by the SharePoint server, the method comprising the steps of:

executing an instance of Outlook on the user computer thereby creating an Outlook display window on a display of the user computer;

invoking, using a DMF client application running on the user computer, a first software application to create a DMF pane in the Outlook display window;

retrieving a most-recently displayed tree view of the user's SharePoint environment, either from a DMF client side cache or, if the DMF client side cache is unavailable, from a DMF web service application running on the SharePoint server;

displaying the retrieved tree view in the DMF pane;

retrieving from the DMF web service application running on the SharePoint server details of files in a default view of the displayed tree view;

updating the DMF client-side cache to reflect the retrieved default view file details; and displaying the updated file details in the DMF pane.

According to another aspect of the present invention, there is provided an apparatus for implementing any one of the aforementioned methods.

According to another aspect of the present invention, there is provided a computer program product including a computer readable medium having recorded thereon a computer program for implementing any one of the methods described above.

Other aspects of the invention are also disclosed.

BRIEF DESCRIPTION OF THE DRAWINGS

At least one embodiment of the present invention will now be described with reference to the drawings and appendices, in which.

DETAILED DESCRIPTION INCLUDING BEST MODE

Figure 1:
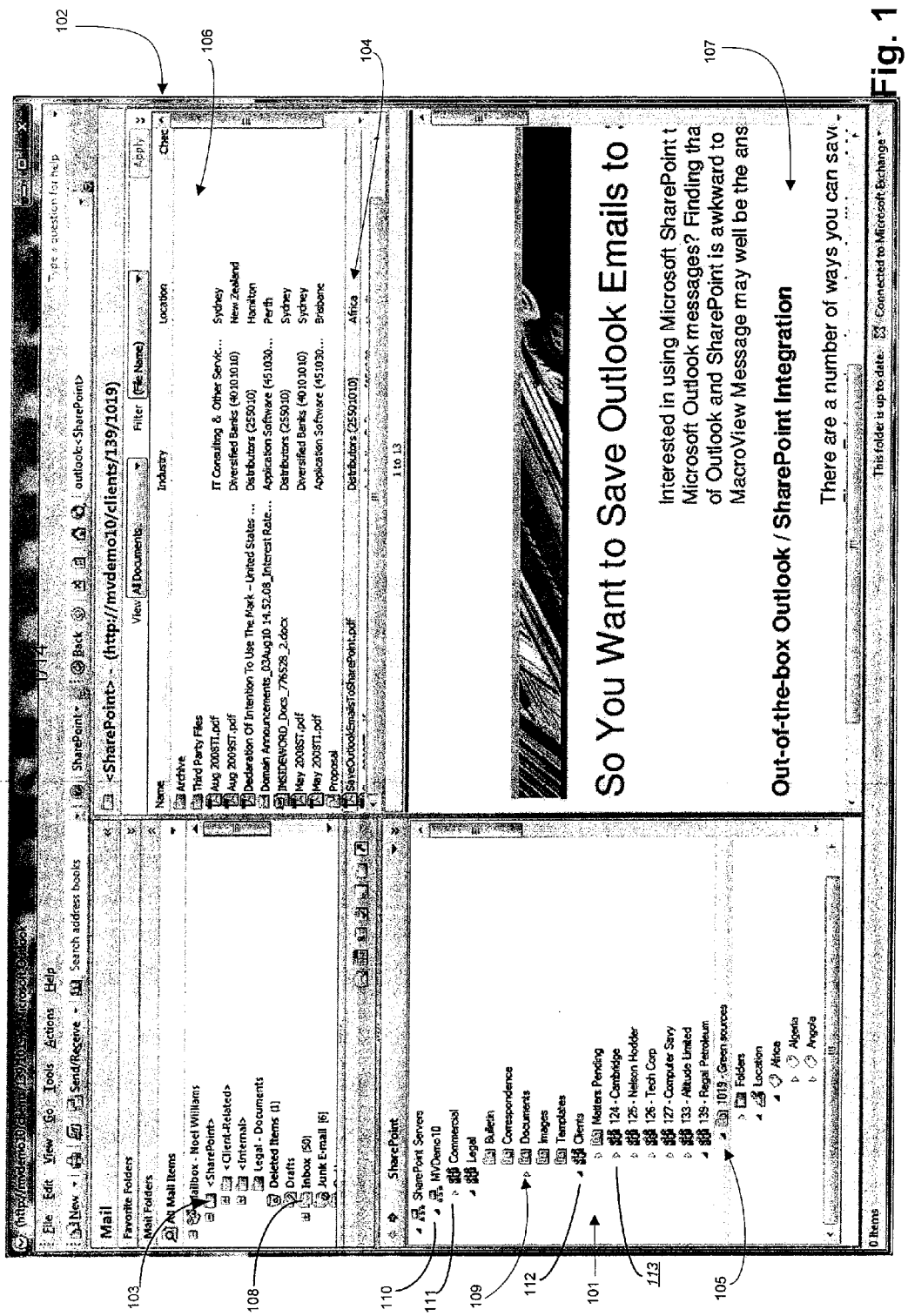
FIG. 1 shows an Outlook display window having a DMF tree-view display of a particular SharePoint document store according to one DMF arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

The DMF Arrangements

The disclosed DMF arrangements address the shortcomings of both the native SharePoint user interface, and the native Outlook/SharePoint user interface. The DMF arrangements do not change the way files or their metadata are stored or processed by SharePoint. However, the DMF arrangements provide an improved user interface for performing document management tasks on a SharePoint platform using Outlook as the front end in a more efficient and accurate manner.

Figure 8A:
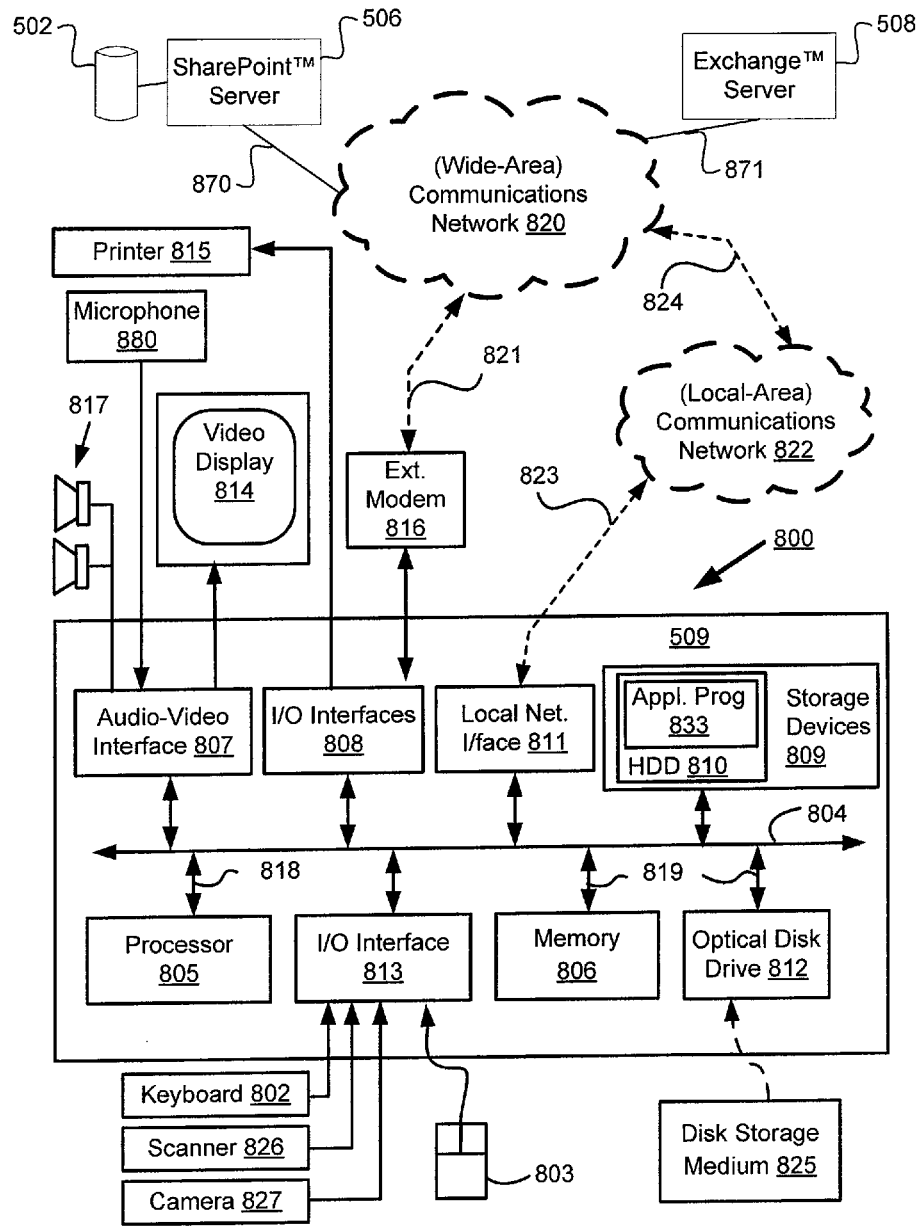
FIGS. 8A and 8B form a schematic block diagram of a general purpose computer system upon which arrangements described can be practiced.
Figure 8B:
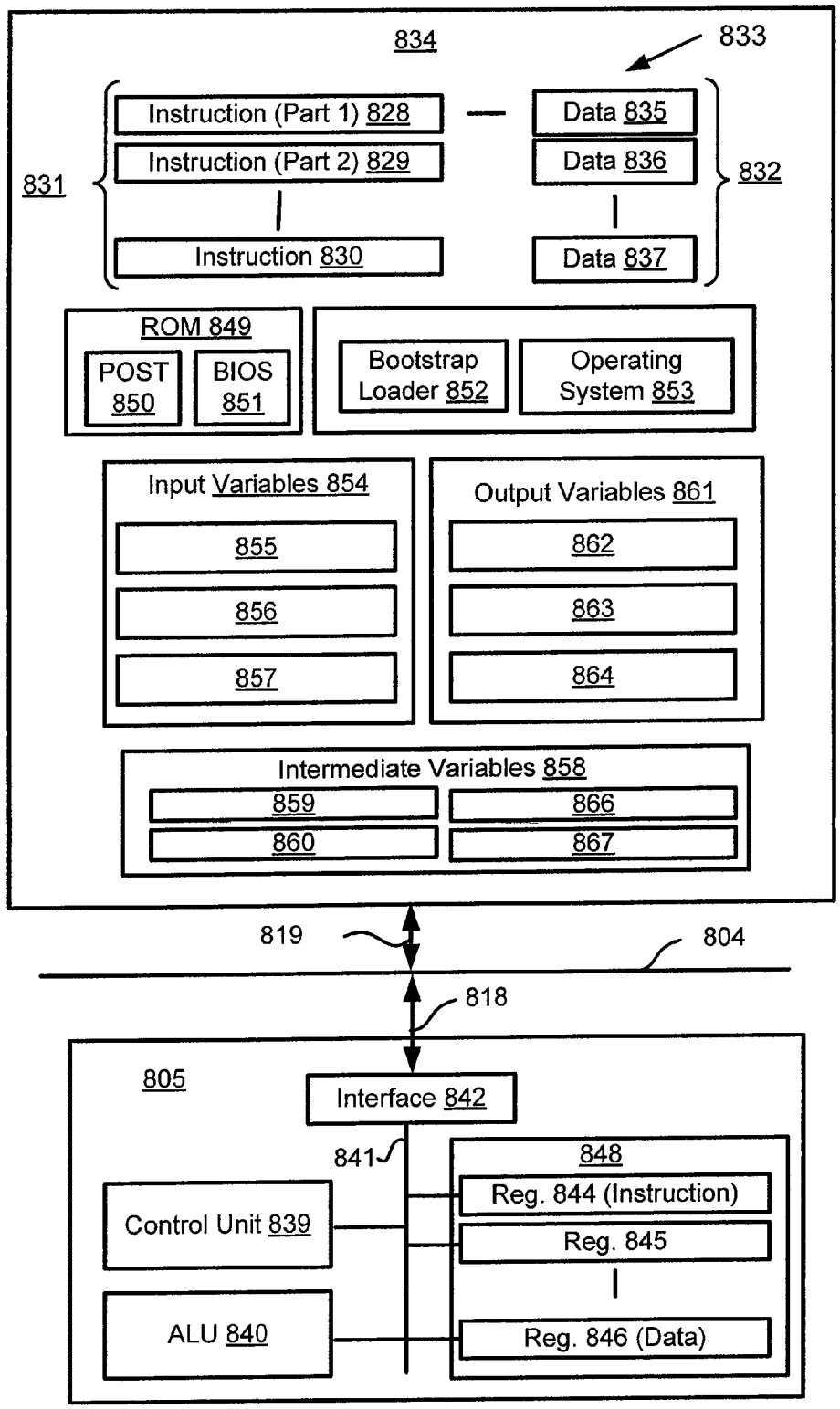

FIGS. 8A and 8B depict a general-purpose computer system 800, upon which the various arrangements described can be practiced.

As seen in FIG. 8A, the computer system 800 includes: a computer module 509; input devices such as a keyboard 802, a mouse pointer device 803, a scanner 826, a camera 827, and a microphone 880; and output devices including a printer 815, a display device 814 and loudspeakers 817. An external Modulator-Demodulator (Modem) transceiver device 816 may be used by the computer module 509 for communicating to and from a SharePoint server 506 and/or an Exchange server 508 via a communications network 820 and connections 821, 870 and 871. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 509 typically includes at least one processor unit 805, and a memory unit 806. For example, the memory unit 806 may have semiconductor random access memory (RAM) and semiconductor read only memory (ROM). The computer module 509 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 509, for example within the interface 808. The computer module 509 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet™ circuit card, a Bluetooth™ wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 800.

The components 805 to 813 of the computer module 509 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM-PC's and compatibles running the Microsoft Windows operating system.

The DMF method may be implemented using the computer system 800 wherein the processes of FIGS. 6, 7 and 9-13, may be implemented as one or more software application programs 833 executable within the computer system 800. In particular, the steps of the DMF method are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the DMF methods and a second part and the corresponding code modules manage a user interface between the first part and the user.

The software may be stored in a computer readable medium, including the storage devices described below, for example. The software is loaded into the computer system 800 from the computer readable medium, and then executed by the computer system 800. A computer readable medium having such software or computer program recorded on the computer readable medium is a computer program product. The use of the computer program product in the computer system 800 preferably effects an advantageous apparatus for practicing the DMF arrangements.

The software 833 is typically stored in the HDD 810 or the memory 806. The software is loaded into the computer system 800 from a computer readable medium, and executed by the computer system 800. Thus, for example, the software 833 may be stored on an optically readable disk storage medium (e.g., CD-ROM) 825 that is read by the optical disk drive 812. A computer readable medium having such software or computer program recorded on it is a computer program product. The use of the computer program product in the computer system 800 preferably effects an apparatus for practicing the DMF arrangements.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 509. Examples of transitory or non-tangible computer readable transmission media that may also participate in the provision of software, application programs, instructions and/or data to the computer module 509 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the HDD 809 and semiconductor memory 806) that can be accessed by the computer module 509 in FIG. 8A.

When the computer module 509 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 509 to ensure proper functioning and typically checks the processor 805, the memory 834 (809, 806), and a basic input-output systems software (BIOS) module 851, also typically stored in the ROM 849, for correct operation. Once the POST program 850 has run successfully, the BIOS 851 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic user interface.

The operating system 853 manages the memory 834 (809, 806) to ensure that each process or application running on the computer module 509 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 1105 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The disclosed DMF arrangements use input variables 854, which are stored in the memory 834 in corresponding memory locations 855, 856, 857. The DMF arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

(a) a fetch operation, which fetches or reads an instruction 831 from a memory location 828, 829, 830;

(b) a decode operation in which the control unit 839 determines which instruction has been fetched; and (c) an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 6, 7 and 9-13 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The DMF methods may alternatively be implemented in dedicated hardware such as one or more gate arrays and/or integrated circuits performing the DMF functions or sub functions. Such dedicated hardware may also include graphic processors, digital signal processors, or one or more microprocessors and associated memories. If gate arrays are used, the process flow charts in FIGS. 6-7, 9-13 are converted to Hardware Description Language (HDL) form. This HDL description is converted to a device level netlist which is used by a Place and Route (P&R) tool to produce a file which is downloaded to the gate array to program it with the design specified in the HDL description.

FIG. 1 shows an Outlook display window 102 having a DMF tree-view display 101 of a particular SharePoint document store according to one DMF arrangement. This tree view is also referred to simply as a DMF tree. The DMF pane 101 shows a hierarchy of SharePoint web applications such as 110, site collections such as 111 and 112, sites such as 113, document libraries such as 105, and folders (eg see 210 in FIG. 2). Contents of a document library 105 entitled "1019—Green sources" in the DMF pane 101 are shown at 106. A particular file 104 that has been selected as depicted by shaded format is shown in "preview" mode at 107.

An innovative aspect of the DMF arrangements is the approach used to display the structure of the SharePoint document store at 101 accurately (in regard to the richness and completeness of the detail displayed) and efficiently (from the perspective of speed and use of computing and memory resources).

Figure 2:
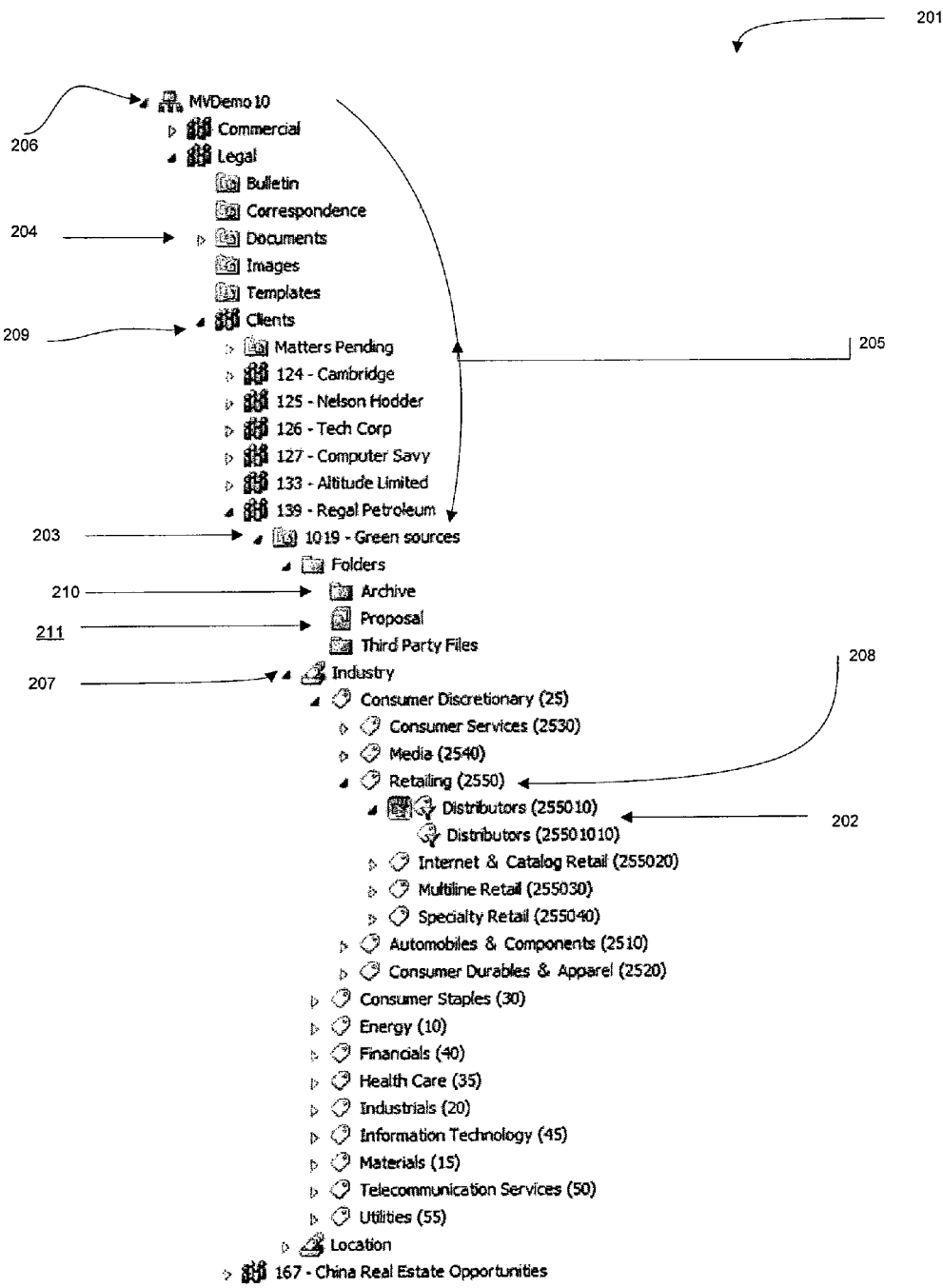
FIG. 2 shows the DMF tree-view structure of the DMF pane in FIG. 1 in more detail.

FIG. 2 shows the DMF tree-view structure 201 of the DMF pane 101 in FIG. 1 in more detail. The view 201 includes detail from the "Web Application level" as depicted, for example, at 206, through to a document library level as depicted, for example, at 203. FIG. 2 also shows folders such as 210, document sets such as 211, categories of logical meta-data based virtual sub-folders such as 207, and logical meta-data based virtual sub-folders such as 208 and 202. The DMF arrangements display '▶' signs such as 204 on nodes within the tree to indicate that the user has permission to access content that is nested under that node and can therefore expand that node. This is the case even if the level of nesting is deep (i.e. not within the immediate sub-nodes). In contrast, the native SharePoint user interface does not provide accurate indication of such nested content to non-Administrator users.

Figure 3:
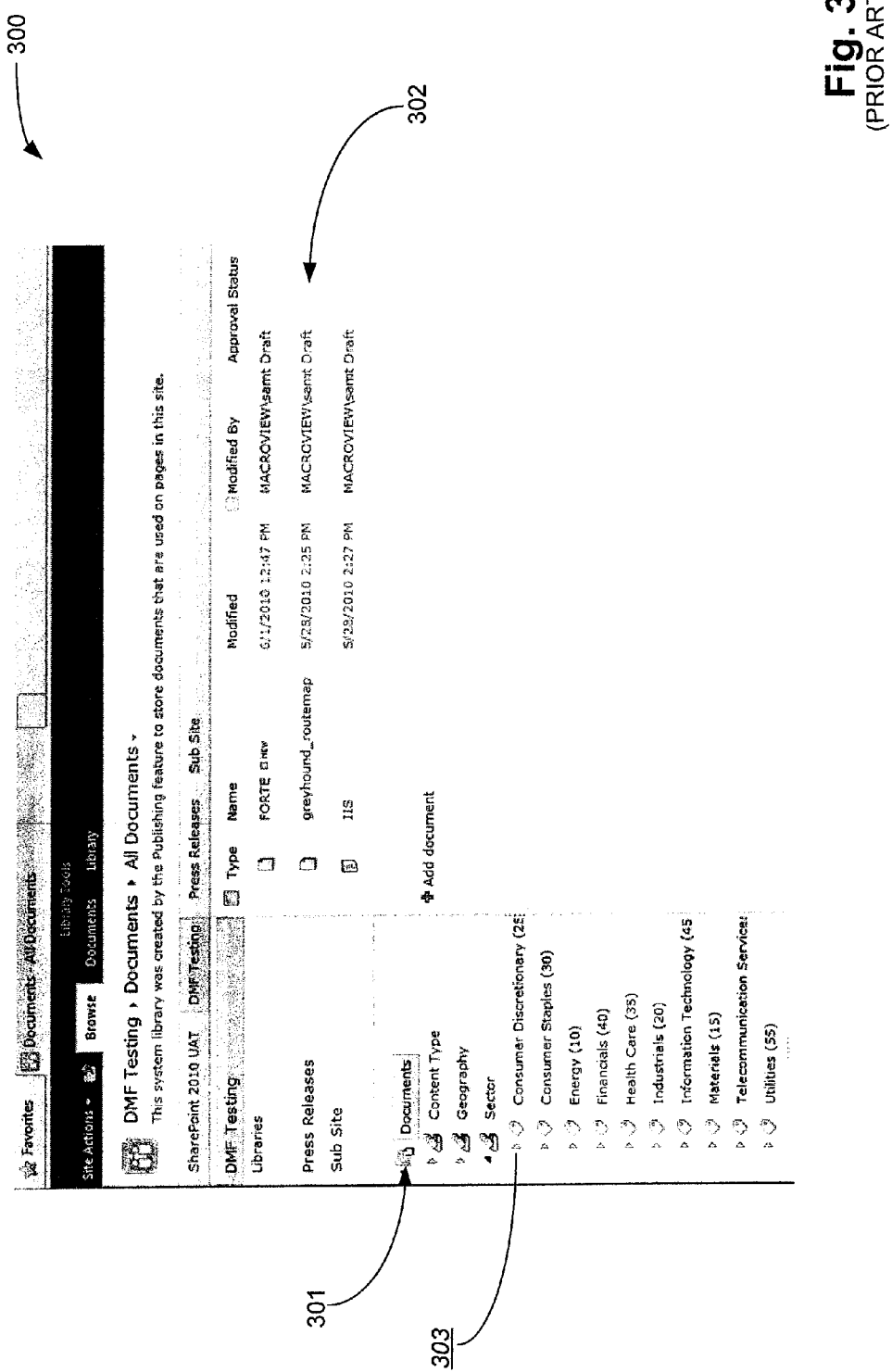
FIG. 3 shows a screen shot of metadata-based logical folders in a single SharePoint document library, using a native SharePoint user interface.

FIG. 3 shows a screen shot 300 of a metadata-based document library such as 301 in a single SharePoint site, using a native SharePoint user interface. The display 300 shows logical (metadata-based) virtual sub-folders such as 303 and content 302 of the folder 301, but not upper levels of the SharePoint tree, such as are provided by the DMF arrangements as depicted at 205.

In contrast, the DMF tree-view 201 shows a complete hierarchy of SharePoint file storage containers all the way up to the SharePoint web application 206. The DMF tree-view 201 display includes even 'logical' containers (groupings of documents based on the metadata that has been recorded for those documents) such as 202.

Figure 4:
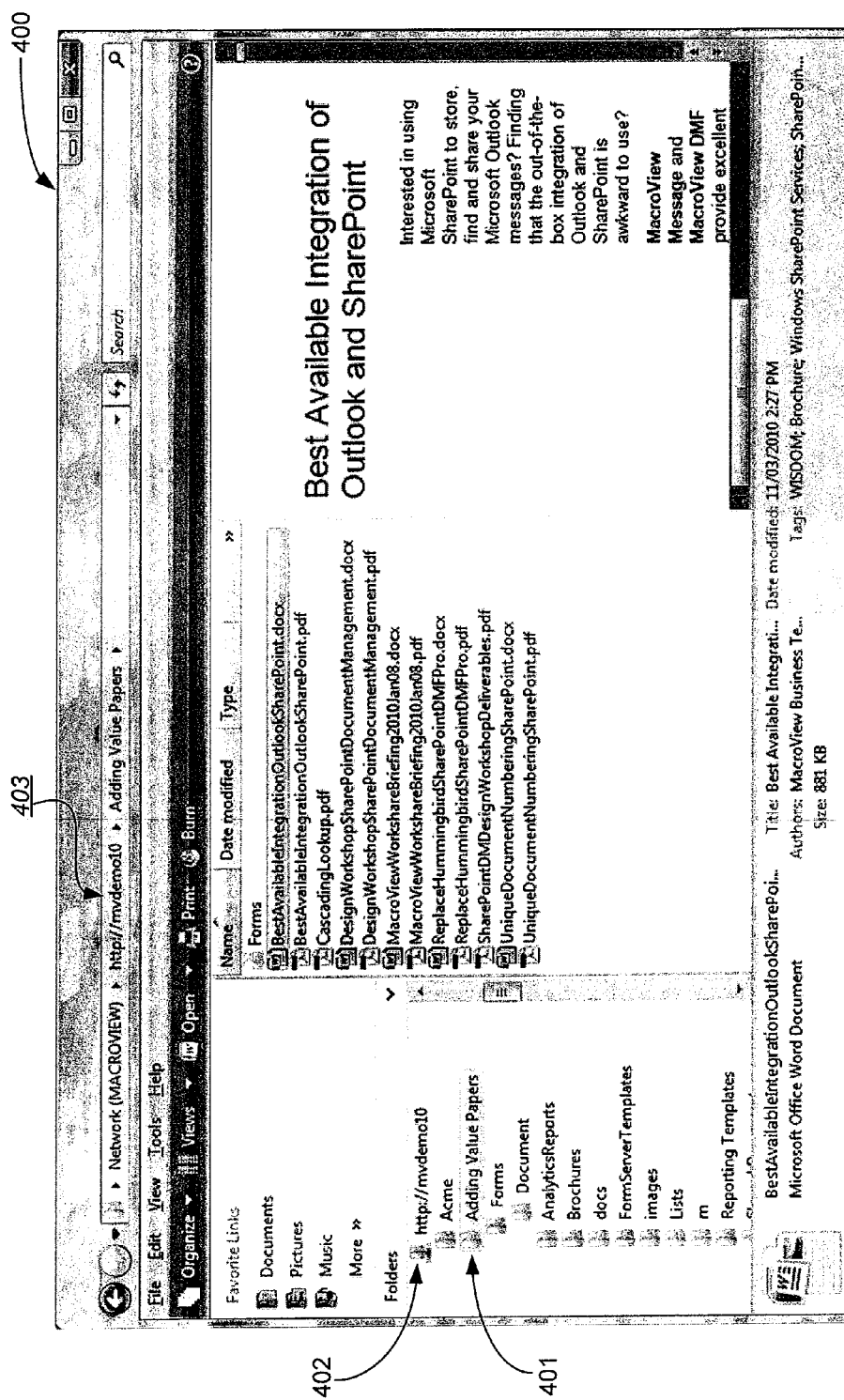
FIG. 4 shows a screen shot of folder icons used to represent the structure of a single SharePoint Site, using a native SharePoint interface through Windows® Explorer®.

FIG. 4 shows a screen shot 400 of folder icons such as 401 used to represent the structure of a single SharePoint web application 402, using a native SharePoint interface based, in the present example, on a Windows® Explorer® client. The view 400 uses generic folder icons such as 401 to represent various types of node in the SharePoint tree structure including site collections, sites, document libraries and folders, but not logical (metadata-based) navigation.

In contrast, nodes within the DMF tree-view 201 in FIG. 2 are displayed with their correct icons such as 203, 206, 207, 208, 209, 210 and 211, respectively representing a document library, a web application, a logical (metadata-based) classification, a logical (metadata-based) tag, a site collection, a folder and a document set so that the various types of nodes can be distinguished.

In order to use the native SharePoint user interface in FIG. 4 the user needs to insert an address 403 into the browser address line in order to access the specific folder of interest 401 which is stored in the SharePoint site. In contrast, the DMF arrangements require only the address(es) of the SharePoint web application(s) as depicted by 206 in FIG. 2 in order to enable the user to access and manipulate any folders and/or documents stored in the SharePoint web application, provided of course that the user has permission to do so.

Figure 9:
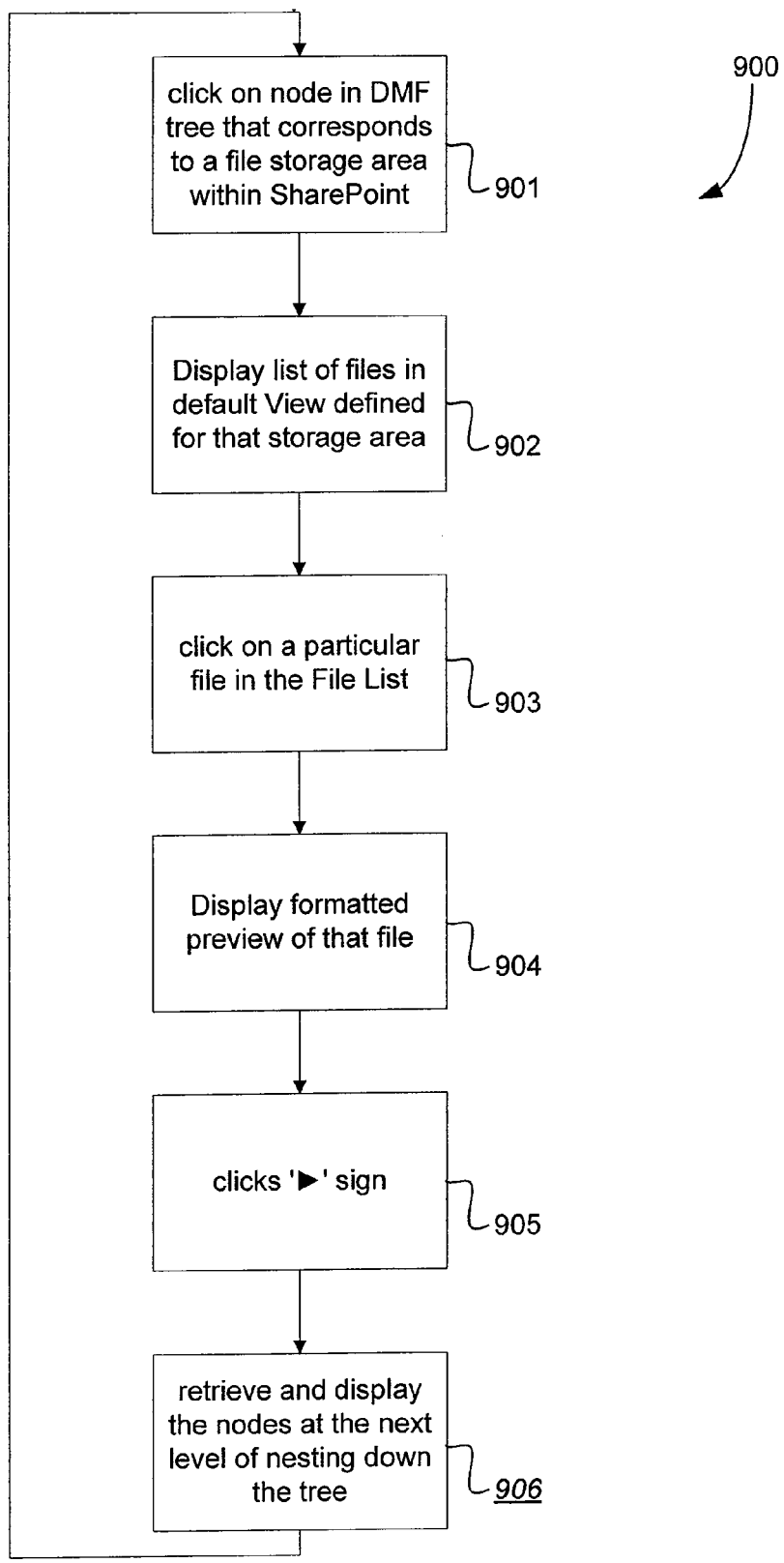
FIG. 9 shows a flow chart of a process for navigating the tree-view of an example DMF arrangement.

FIG. 9 shows a flow chart of a process 900 for navigating the tree-view of an example DMF arrangement.

Efficient Display

The DMF arrangements display the tree-view structure in the DMF pane making efficient use of machine resources. The DMF arrangements also minimise the user effort required to navigate a SharePoint document store. These characteristics make the DMF arrangements suitable for use with SharePoint document stores that are large in terms of their number of storage nodes and/or the volume of files stored in any node.

General Operation

In a first step 901 the user clicks on a node such as 203 in the DMF tree 201. The DMF tree 201 represents information (e.g. a document library or a SharePoint folder) in a SharePoint web application. In a following step 902 the user sees a list of files 201 in a default View defined for that document library or folder. In a subsequent step 903 the user clicks on a particular file 104 in the File List, and in a step 904 the user sees a formatted preview 107 of the selected file. The screen shot in FIG. 1 shows the preview generated when a user clicks on a PDF in a document library called '1019—Green sources', which is located in a Site called '139—Regal Petroleum'.

A node (such as 105) in the tree-view 101 has a '▶' sign displayed adjacent to it if the user in question has permission to access files that are stored in the sub-tree that lies "underneath" that node. This is the case even if the files are deeply nested—i.e. not in sub-nodes immediately beneath the node 105 being clicked. If the user clicks the '▶' sign at 105 in a subsequent step 905, the DMF arrangement efficiently retrieves and displays in a step 906 the nodes (not shown in FIG. 1) at the next level of nesting down the tree.

If the user clicks on a "mail" inbox 108 then mail messages will be shown in the area 106 according to the normal Outlook functionality. The user can then save one or multiple email messages or one or multiple attachments in the area 106 to SharePoint simply by dragging and dropping the messages or attachments from the area 106 in Outlook to a desired node such as 109 in the DMF tree-view pane 101 that corresponds to a document library or folder in SharePoint.

In addition to uploading the email(s) and/or attachment(s) into SharePoint by means of the drag-and-drop mechanism described above, the DMF arrangements record metadata in line with the definition of the destination document library. Accordingly, if an email message is dragged and dropped as described above, from the area 106 (when that area is serving to display email messages stored in the inbox 108) to the document library or folder 109, for example, then as it saves the email message to the folder 109 in SharePoint, the DMF arrangement automatically names the email message and records standard email attributes such as To, From, Subject, SentOn (date time), etc, provided that correspondingly-named metadata columns are defined in the destination document library 109. The DMF arrangements also prompt the user to supply values for any metadata columns that are defined in the destination document library 109 but that cannot set automatically. Thus if the destination document library 109 requires an item of metadata in regard to the email message being dragged from the area 106 to the folder 109 which cannot be generated automatically by the DMF arrangement, then the user will be prompted to provide the necessary item of metadata.

The native Outlook/SharePoint user interface does not support drag and drop saving of emails and attachments as described above for the DMF arrangements.

Innovative Techniques

Figure 5:
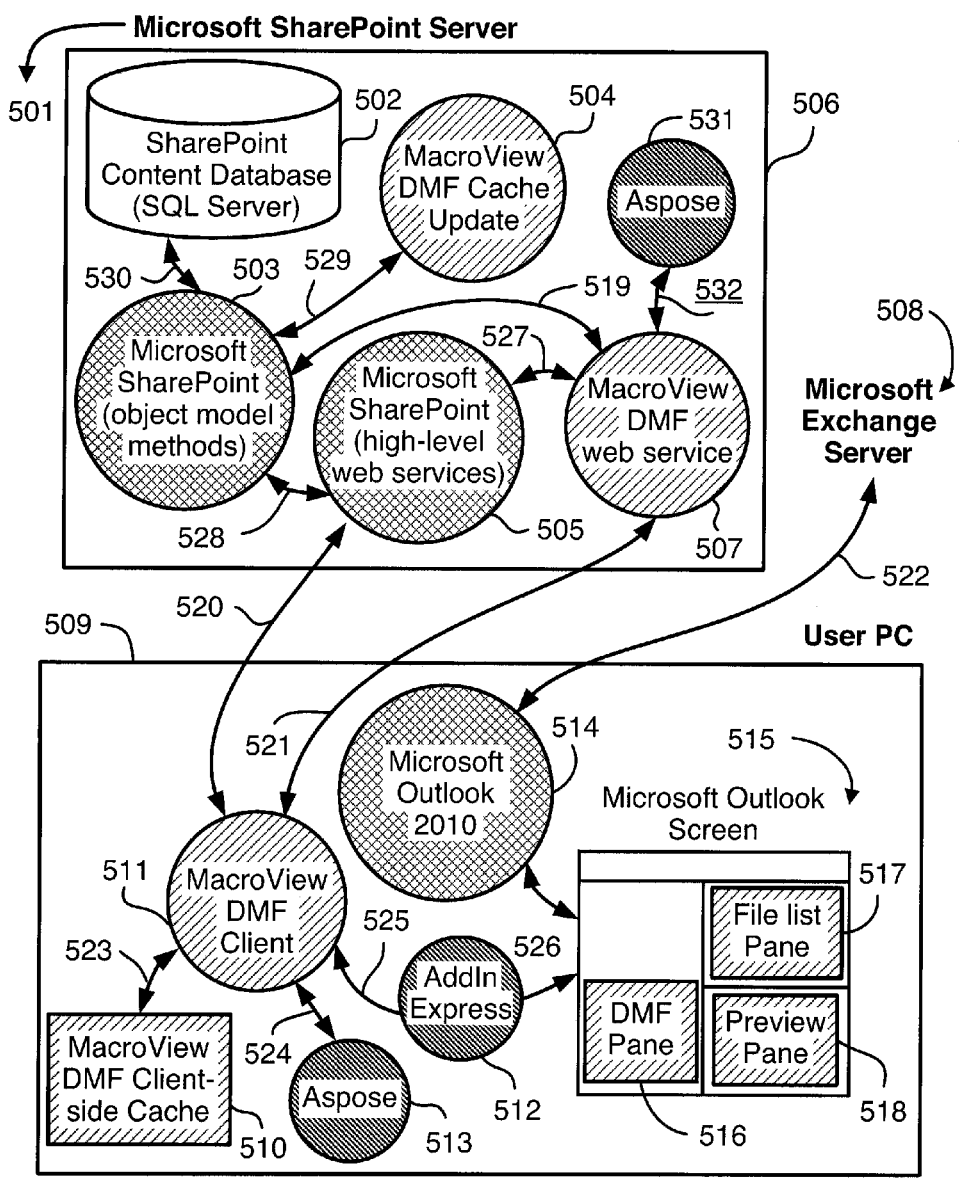
FIG. 5 depicts a system architecture for practicing the DMF arrangements.

The DMF arrangements utilise a highly innovative combination of techniques. These include:

Server-side pre-processing and caching so that the structure lying below each node is recorded in convenient form in each container node. This significantly reduces processing times when a user clicks to expand a node in the DMF tree;

Client-side caching, so that the most recently displayed tree structure can be re-displayed with a minimum of processing;

Server-side filtering and searching to minimise bandwidth usage when navigating to sub-nodes in the DMF tree;

Filtered, choked display of the file list, so that details of only N files are retrieved in any one round-trip to the server, even if the document library contains thousands of files;

Replacement of Microsoft-supplied web-service methods with more efficient methods in a custom web service;

FIG. 5 depicts a system architecture for practicing the DMF arrangement. The figure depicts how DMF applications 504, 507, 511 and 516 interact with Microsoft-supplied applications 503, 505 and 514 and third-party applications 512 and 513 to provide the DMF tree-view of SharePoint material using Outlook as the front end. In one example the third party applications 512 and 513 run on the user PC 509 however they can also run on another local machine (not shown) situated near to and communicating with the user PC 509.

The user PC 509 communicates, as depicted by arrows 520, 521 with the SharePoint server 506. The user PC 509 communicates, as depicted by an arrow 522 with an Exchange server 508.

In the user PC 509 a DMF client application 511 communicates, as depicted by an arrow 523, with a DMF client-side cache 510. The DMF client-side cache 510 runs on the user PC 509 in the present example, however the cache 510 can also run on another local machine which communicates with the user PC 509. A third party application 513 communicates, as depicted by an arrow 524, with the DMF client application 511 to generate a preview image for a preview pane 518 (also see 107 in FIG. 1) in an Outlook screen display 515. A third party application 512 communicates, as depicted by arrows 525 and 526, with the DMF client application 511 and the DMF pane 516 (also see 101 in FIG. 1), a file list pane 517 (also see 106 in FIG. 1) and the preview pane 518 (also see 107 in FIG. 1) in the Outlook screen display 515.

Turning to the SharePoint server 506, the DMF Web service application 507 communicates, as depicted by an arrow 519, with a SharePoint object model methods application 503. The DMF Web service application 507 also communicates, as depicted by an arrow 527, with a SharePoint high level web services application 505. The SharePoint high level web services application 505 communicates, as depicted by an arrow 528, with the SharePoint object model methods application 503. The SharePoint object model methods application 503 communicates, as depicted by an arrow 529, with a DMF cache update application 504. The SharePoint object model methods application 503 communicates, as depicted by an arrow 530, with a SharePoint content database 502. A third party application 531 communicates, as depicted by an arrow 532, with the DMF web service application 507.

Figure 10:
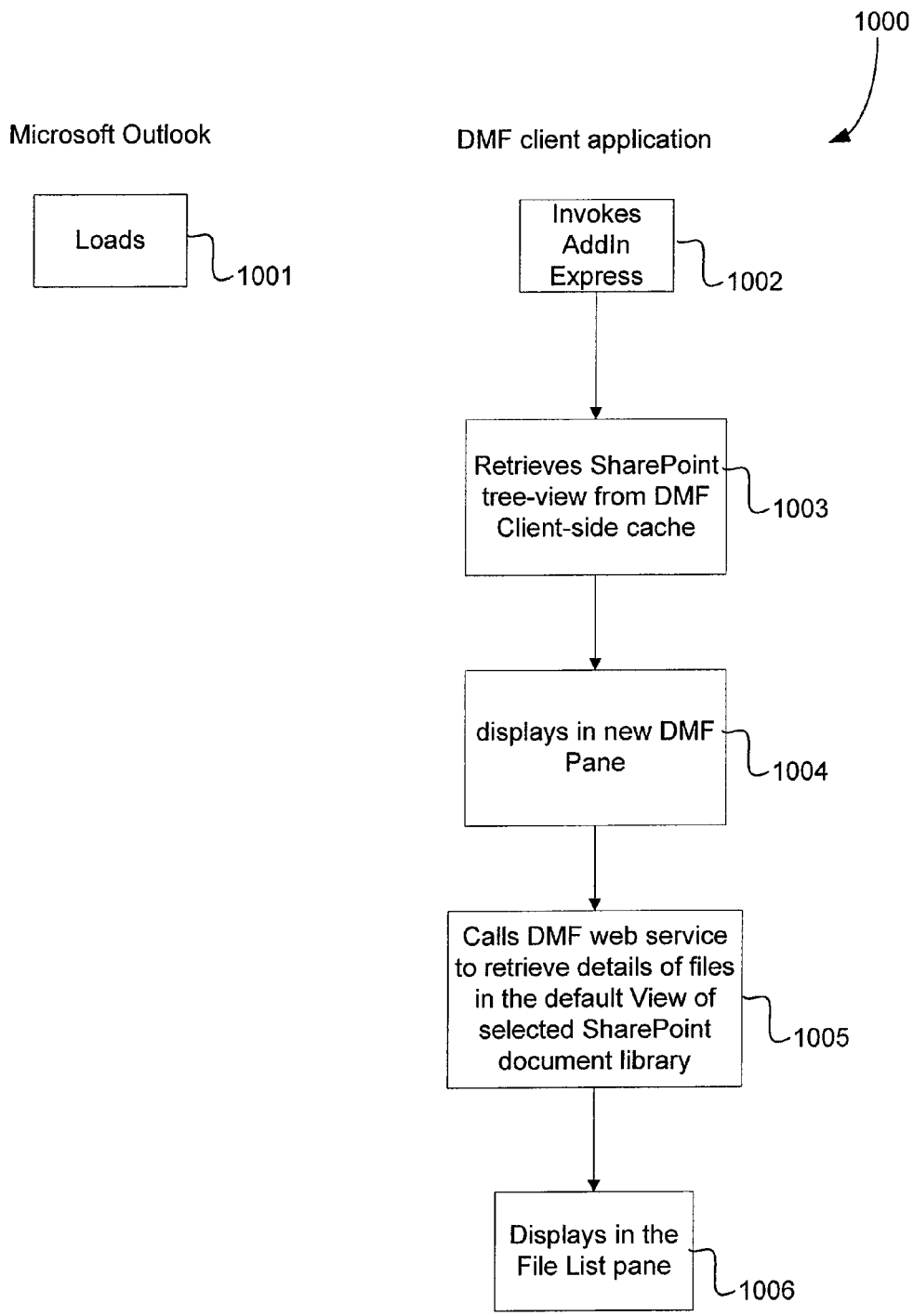
FIG. 10 shows a flow chart of a process for activating a DMF arrangement from Outlook.

FIG. 10 shows a flow chart of a process 1000 for activating the DMF arrangement from Outlook.

Initial Display Processing Steps

As Outlook loads (ie executes) in a step 1001, the DMF Client application 511:

invokes, in a step 1002, the AddIn Express application 512 or an equivalent third party software application, to create a new DMF pane 101 located at the bottom left of the Outlook display window 102;

retrieves, in a step 1003, the most-recently displayed form of the user's SharePoint environment from the DMF Client-side cache 510, and displays, in a step 1004, this environment in the new DMF Pane 101;

calls, in a step 1005, the DMF web service application 507 to retrieve details of files and folders in the default View of the selected SharePoint document library, which the DMF Client application 511 then displays, in a step 1006, in the File List pane 106, located in the normal file list position at the right of the Outlook screen 102.

Figure 11:
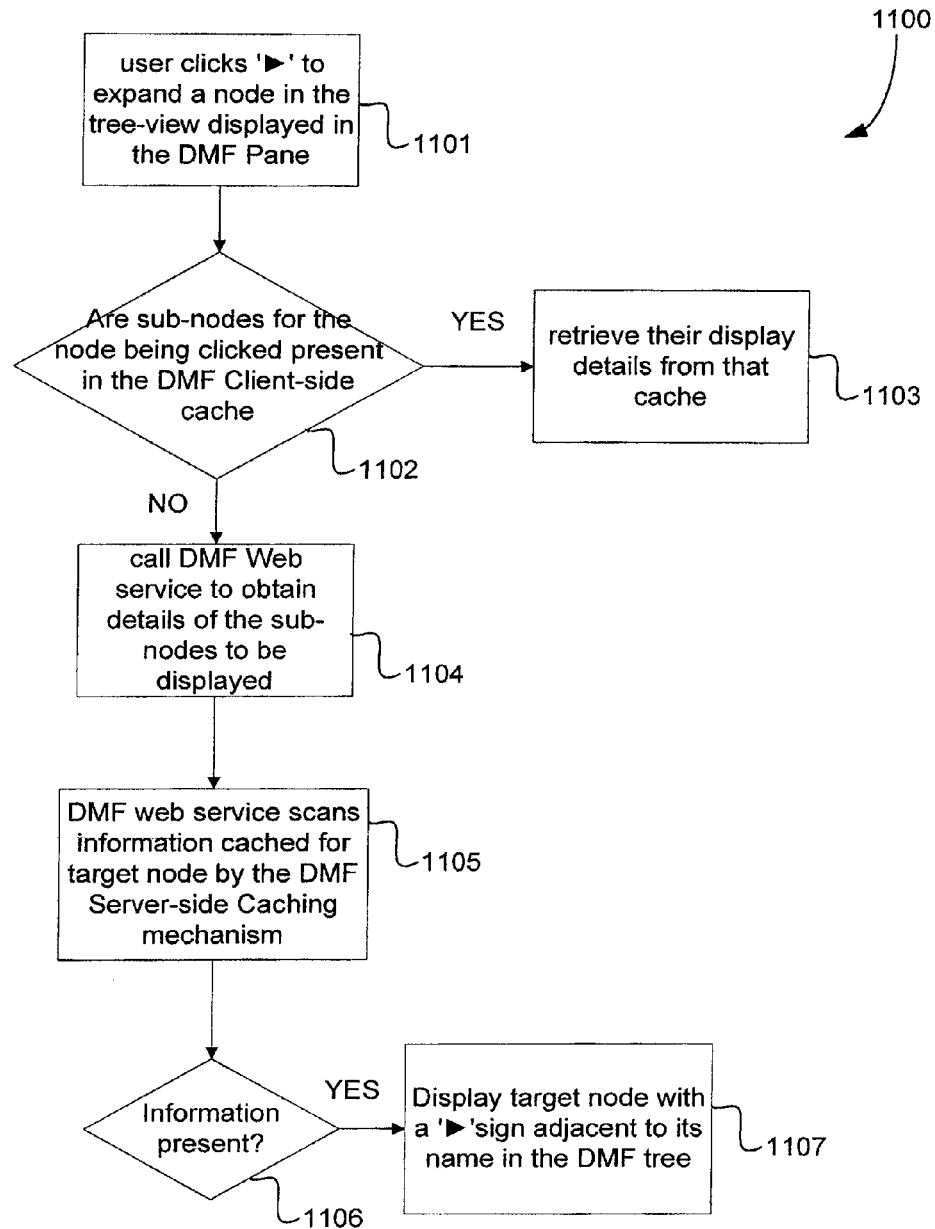
FIG. 11 shows a flow chart for navigating the DMF pane.

FIG. 11 shows a flow chart of a process 1100 for navigating the DMF pane.

Efficient and Accurate Display of Sub-Nodes in the DMF Tree

When the user clicks, in a step 1101, a '▶' sign such as 204 to expand a node in the DMF tree-view displayed in the DMF Pane 201, the DMF Client application 511 first checks, in a step 1102, whether the sub-nodes for the node being clicked (the target node which in the present example is 204 in FIG. 2) are present in the DMF Client-side cache 510 and if so, retrieves, in a step 1103, their display details from that cache 510. This is described in more detail in regard to FIG. 6 below.

If the sub-nodes for the node being clicked (the target node 204 in the present example) are not present in the DMF Client-side cache 510, the DMF Client application 511 calls, in a step 1104, the DMF Web service application 507 to obtain details of the sub-nodes to be displayed. The DMF web service application 507 scans, in a step 1105, the information that has been cached for the target node 204 by the DMF Server-side Caching mechanism 504. This cached information is stored in a convenient format, which significantly reduces the processing time that would otherwise be required if the DMF arrangement were to scan the sub-nodes in the server 506, to determine whether any of them (or their child nodes) contain files for which the user has access permission. If a following step 1106 determines that such files are present (at whatever level of nesting), the target node 204 will be displayed, in a step 1107, with a '▶' sign adjacent to its name in the DMF tree.

In a deeply nested SharePoint site structure, such a scan can otherwise require a significant amount of resources, especially if there are breaks in the inheritance of permission as the system proceeds down the tree. The ability to overcome the difficulty of performing this scan across a large SharePoint document store in a high-performance manner, while respecting the SharePoint permission model, is a key advantage of the disclosed DMF approach. The combination of client-side caching and server side caching enables such a scan to be performed in an efficient manner.

Server-Side Caching Mechanism

One of the ways the DMF arrangements achieve good performance when a user clicks to expand a Site node in the SharePoint tree structure (the 'target node') is by accessing information about the sub-nodes of that target node that is cached (stored in a convenient form) in XML format within a Property Bag of the Web that corresponds to the Target Node. This cached information is maintained using a combination of techniques as follows:

1) Cache Refresh Event Handler—Event Handler stapled to each Site in the SharePoint tree, which fires as that Site is updated and records updated information in the Property Bag for that Site. It is noted that the term "Web" is the underlying SharePoint object model term for a site.

2) Incremental Cache Refresh Job—a SharePoint Timer Job that runs (typically once per hour) across all sites in the SharePoint tree, refreshing details stored in the Property Bag of each site. This Timer Job is able to pick up changes that cannot be trapped by the Event Handler (such as changes to the Title of the Site, or its permissions).

3) Full Cache Refresh Job—a SharePoint Timer Job that runs (typically once per day) across all sites in the SharePoint tree, refreshing details stored in the Property Bag of each site. This Full Cache Refresh picks up all changed details, including those that are missed as a result of the failure of individual Incremental Cache Refresh Jobs. See FIG. 7, below.

Figure 6:
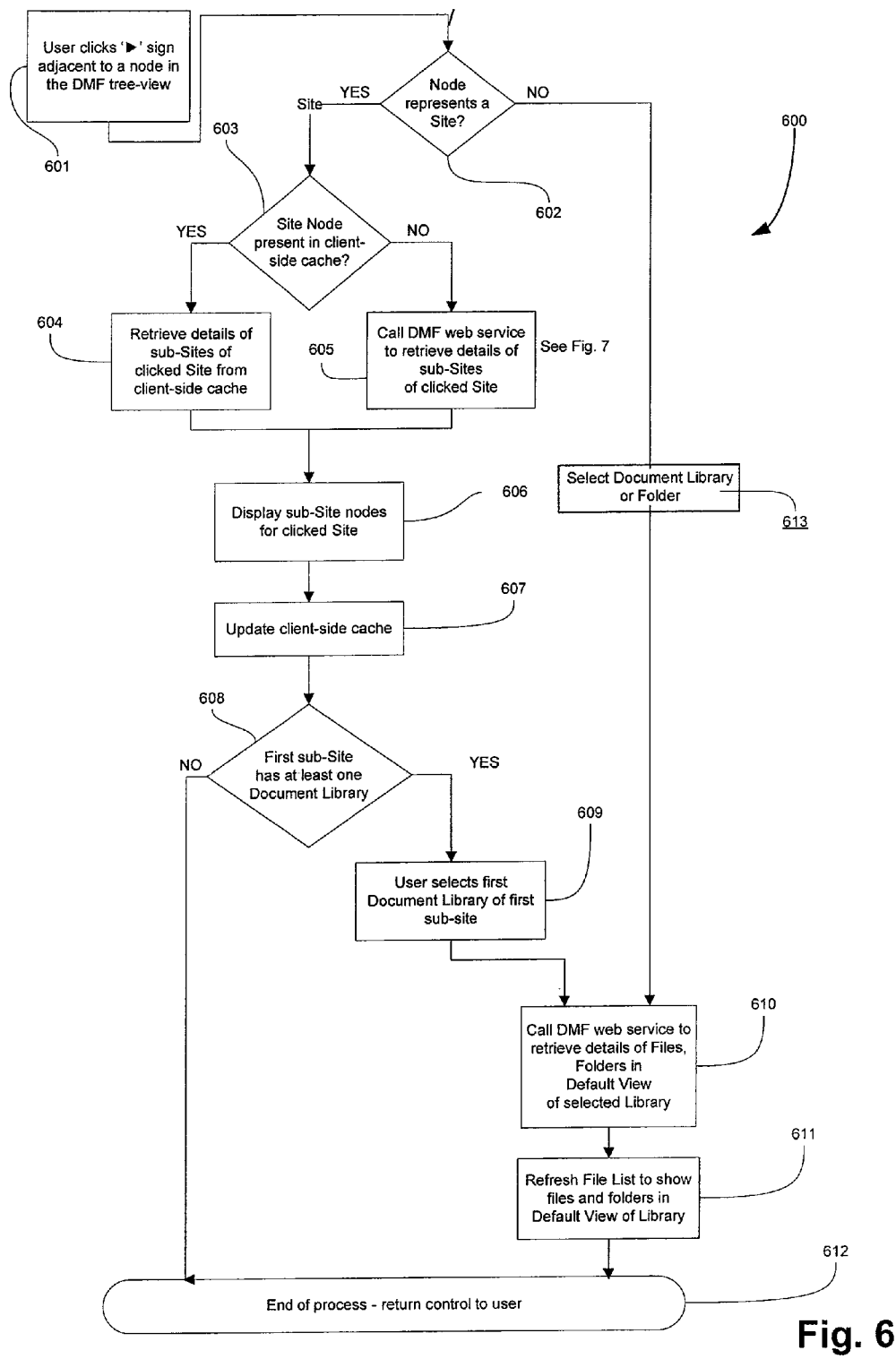
FIG. 6 is a flow chart showing an example of a DMF process for a user to expand a node in the tree-view display in the DMF Pane of FIG. 1.

FIG. 6 is a flow chart showing an example of a DMF process 600 for a user to expand a node in the tree-view display in the DMF Pane 101 of FIG. 1. In a first step 601 the user clicks a "▶" sign adjacent to a node such as 209 in the DMF tree-view. The node 209 in this example is referred to as the "target node". In a following decision step 602 the DMF client application 511 determines if the node represents a site collection (such as 111 or 112 in FIG. 1) or a site (such as 113 in FIG. 1), or if it represents a document library (such as 105 in FIG. 1) or a folder (such as 210 in FIG. 2). If the node is a site collection or a site, the process 600 follows a "site" arrow (representing a logical "YES" condition) to a step 603.

In the step 603 the DMF client application 511 determines if the site collection node or the site node identified in the step 602 is present in the DMF client-side cache 510. If this is the case the process follows a "YES" arrow from the step 603 to a step 604. In the step 604 the DMF Client application 511 retrieves details of sub-sites of the clicked site from the client-side cache 510. As can be seen from FIG. 1, the site collection 111 contains the site collection 112 as well as the site 113. The term "sub-site" is used to refer to site collections and sites which are contained in a site collection. Accordingly, both the site collection 112 and the site 113 are sub-sites of the site collection 111. In one example, only sub-sites one level down from the target site are retrieved in the step 604.

Returning to the step 603, if the step 603 determines that the site node is not present in the client-side cache 510, then the process follows a "NO" arrow from the step 603 to a step 605. In the step 605 the DMF Client application 511 calls the DMF web service application 507 to retrieve details of sub-sites of the target site (this is described in FIG. 7 beginning at step 701). The process is then directed from the step 605 to step 606.

In the step 606, the DMF Client application 511 displays the sub-site nodes for the clicked site. In a following step 607 the DMF Client application 511 updates the client-side cache 510. In a following decision step 608 the DMF client application 511 determines if the first sub-site has at least one document library. If this is the case the process follows a "YES" arrow to a step 609. In the step 609 the user selects the first document library of the first sub-site. In a following step 610 the DMF Client application 511 calls the DMF web service application 507 to retrieve details of files and folders in the default view of the selected library. In a following step 611 the DMF Client application 511 refreshes the File List to show files and folders in the Default View of the Library and reflects this in the information displayed in the DMF pane. The process is then directed to a step 612 whereupon processing is complete and the user regains control.

Returning to the step 602, if the DMF Client application 511 determines that the node does not represent a site or a site collection, meaning that the target node is a document library or a folder, the process 600 follows a "NO" arrow from the step 602 and then selects, in a step 613, the aforementioned document library or folder and proceeds to the step 610.

Returning to the step 608, if the DMF Client application 511 determines that the first sub-site does not have at least one Document Library, then the process follows a "NO" arrow from the step 608 to the step 612 whereupon processing is complete and the user regains control.

Figure 7:
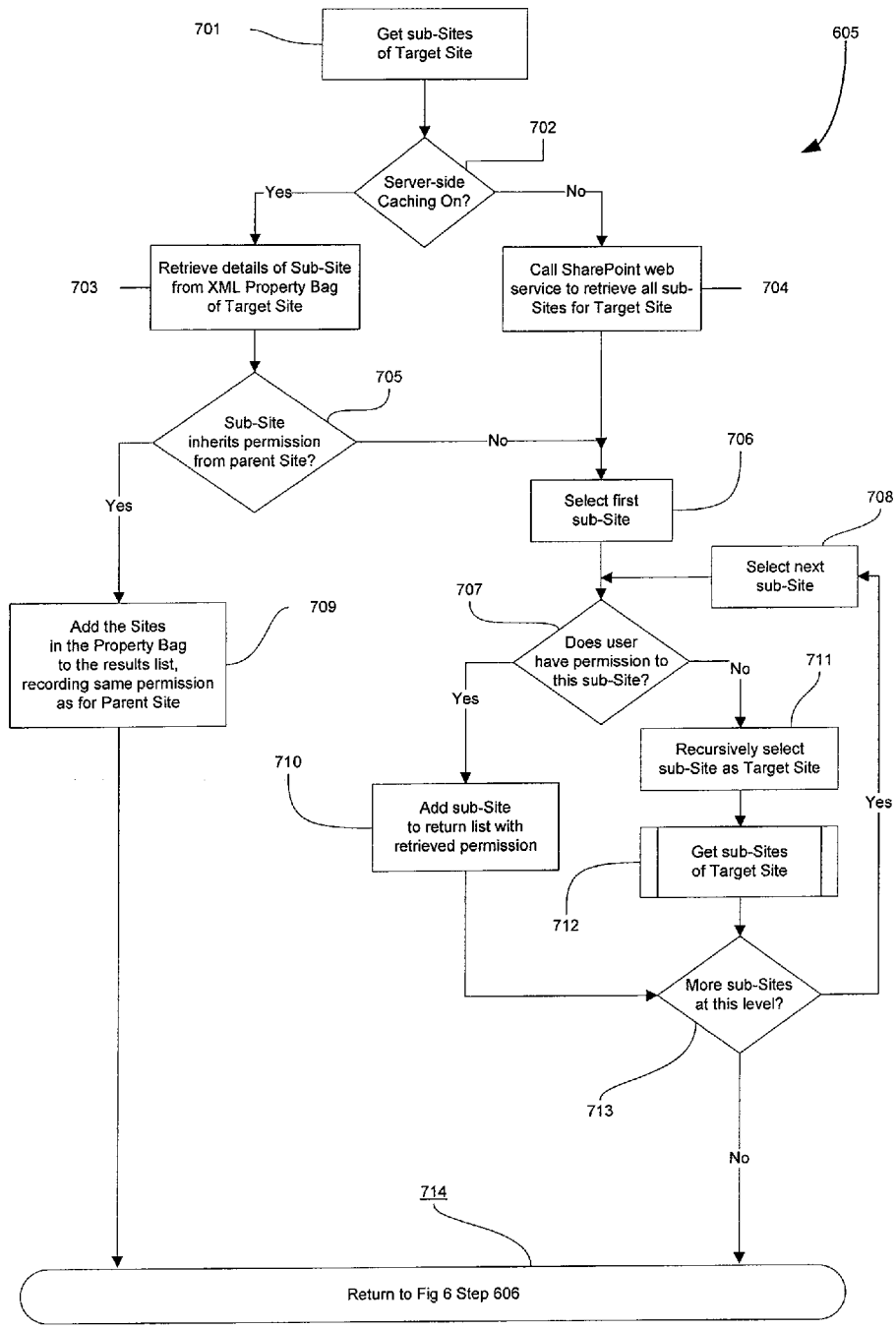
FIG. 7 is a flow chart showing an example of a DMF process for a client-side request for sub-sites of a Target site.

FIG. 7 is a flow chart showing an example of the step 605 in FIG. 6 and depicts the DMF web service application 507 responding to a request from the DMF Client application 511 for sub-sites of a Target Site. In a step 701 the DMF web service application 507 retrieves the sub-sites of the Target Site. In a following decision step 702, the DMF web service application 507 determines if the Server-side caching application 504 in ON. If this is the case, the process follows a "YES" arrow to a step 703. In the step 703 the DMF web service application 507 retrieves details of the Sub-site(s) from the XML Property Bag of the Target Site. The process is then directed to a step 705 in which the DMF web service application 507 determines if the Sub-Site inherits permission from the parent site. If this is so, the process follows a "YES" arrow to a step 709. In the step 709 the DMF web service application 507 adds the Sites in the XML Property Bag to the results list, recording the same permission as for the Parent Site. The results list is the list of sub-sites, identified by the DMF web services application 507 that is returned to the DMF Client application 511 running on the user PC 509. The process is then directed to a step 714. Processing then resumes at the step 606 in FIG. 6.

Returning to the step 705, if the step determines that the sub-site does not inherit permissions from the parent site, then the process follows a "NO" arrow to a step 706. In the step 706 the DMF web service application 507 selects a first sub-site. In a following decision step 707 the DMF web service application 507 determines if a user has permission to access the sub-site in question. If this is so, the process follows a "YES" arrow to a step 710. In the step 710 the DMF web service application 507 adds the sub-site to the results list with retrieved permission. The process is then directed to a determination step 713. In the step 713 the DMF web service application 507 determines if there are more sub-sites at the present level. If this is not so, the process follows a "NO" arrow to the step 714.

Returning to the step 702, if the DMF web service application 507 determines that the server side caching application 504 is not on, the process follows a "NO" arrow from the step 702 to a step 704. In the step 704 the DMF web service application 507 calls the SharePoint web service application 505 to retrieve all sub-sites for the target site. The process is then directed to the step 706.

Returning to the step 707, if the step 707 determines that the user does not have permission to the sub-site in question, then the process follows a "NO" arrow from the step 707 to a step 711. In the step 711 the DMF web service application 507 recursively selects a sub-site as a Target site. In a following step 712 the DMF web service application 507 gets the sub-sites of the target site. The process is then directed to the step 713. The step 711 deals with the situation in which there is a "broken" inheritance permission, as would be the case if the user has permission to access the site 113 in FIG. 1 (labelled "Cambridge"), but does not have permission to access the site collection 112 (labelled "Clients"). In other words, the step 711 ensures that the user is provided with access to all nodes for which the user has permission, even if there are breaks in the chain of permission as the tree is traversed.

Returning to the step 713, if the DMF web service application 507 determines that there are more sub-sites at the present level, the process follows a "YES" arrow from the step 713 to a step 708. In the step 708 the DMF web service application 507 selects the next sub site. The process is then directed back to the step 707.

Figure 12:
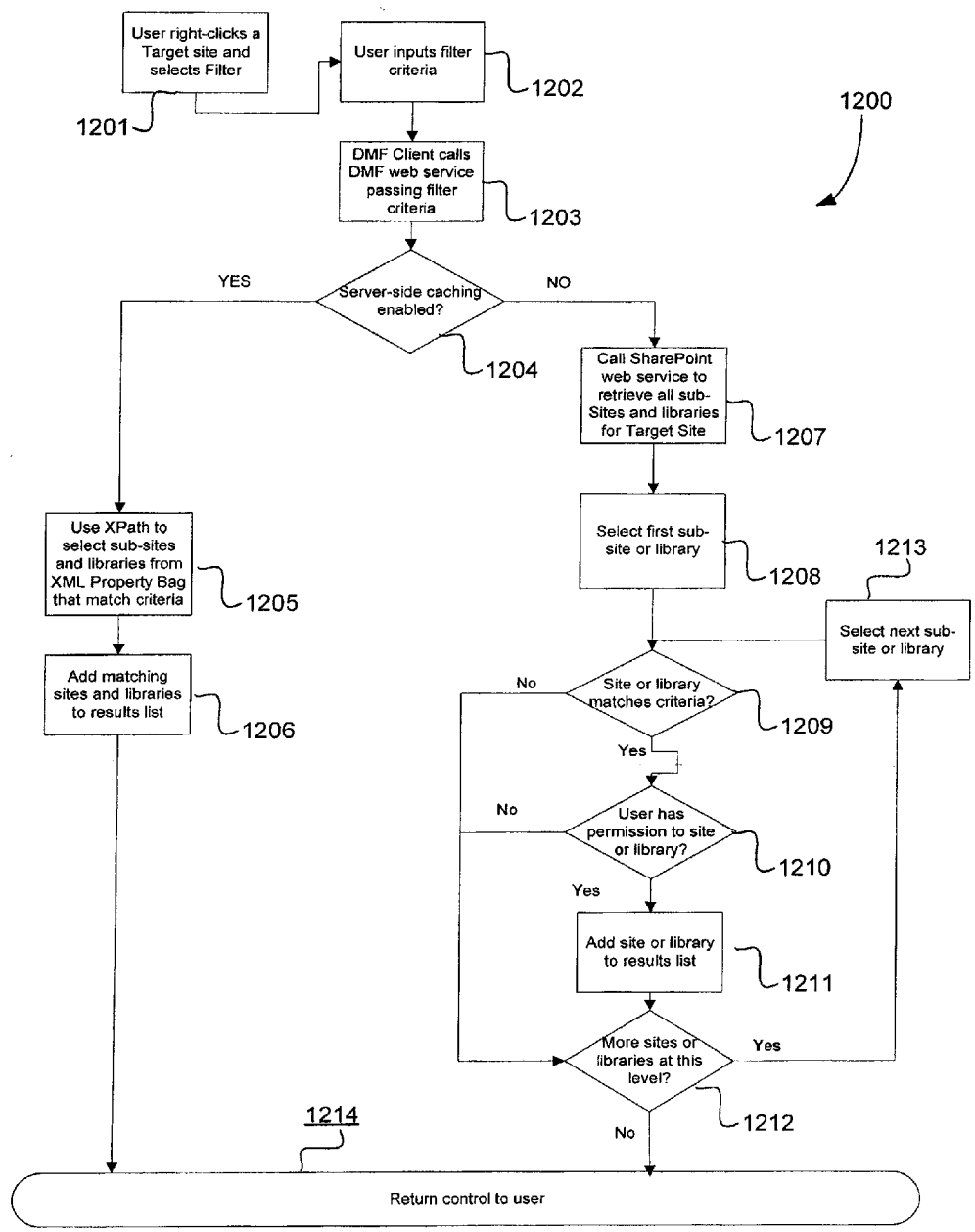
FIG. 12 is a flow chart of a process for displaying sites and libraries that match filter criteria.

FIG. 12 is a flow chart showing an example of a server side filtering process 1200 and depicts the DMF web service application 507 responding to a request from the DMF Client application 511 for the sites and libraries that match filter criteria entered by the user. In a step 1201, the user right-clicks a Target Site in the DMF Pane and selects the Filter option. In a following step 1202, the user is prompted to enter criteria which will be used to filter the results list returned by the DMF web service application 507 for display in the DMF Client application 511. In a following step 1203, the DMF Client application 511 calls the DMF web service application 507 to retrieve a list of sites and libraries that match the filter criteria entered in the step 1202 by the user. In a following decision step 1204, the DMF web service application 507 determines if the Server-side caching application 504 in ON. If this is the case, the process follows a "YES" arrow to a step 1205. In the step 1205 the DMF web service application 507, via an)(Path query, retrieves details of the sub-sites and libraries that match the criteria entered by the user in the step 1202 from the XML Property Bag of the Target Site. The process is then directed to a step 1206 in which the DMF web service application 507 adds the sites and libraries in the XML Property Bag that match the criteria entered by the user in step 1202 to the results list, recording the same permission as for the Parent Site. The results list is the list of sub-sites and libraries, identified by the DMF web service application 507 that is returned to the DMF Client application 511 running on the user PC 509.

Returning to the step 1204, if the DMF web service application 507 determines that the server side caching application 504 is not on, the process follows a "NO" arrow from the step 1204 to a step 1207. In the step 1207 the DMF web service application 507 calls the SharePoint web service application 505 to retrieve all sub-sites for the target site. The process is then directed to the step 1208 where the DMF web service application 507 selects the first sub-site or library in the list returned in the step 1207. In a following decision step 1209, if the DMF web service application 507 determines that the sub-site or library selected in the step 1208 matches the criteria entered by the user in the step 1202, the process follows the "YES" arrow to a step 1210. In the step 1210 the DMF web service application 507 determines if a user has permission to access the sub-site or library in question. If this is so, the process follows a "YES" arrow to a step 1211. In the step 1211 the DMF web service application 507 adds the sub-site or library to the results list with retrieved permission. The process is then directed to a determination step 1212.

Returning to the step 1209, if the DMF web service application 507 determines that the sub-site or library selected in step 1208 does not match the criteria entered by the user in step 1202, the process follows the "NO" arrow to the step 1212.

Returning to the step 1210, if the DMF web service application 507 determines that the user does not have permission to the sub-site or library selected in step 1208, the process follows the "NO" arrow to the step 1212.

Returning to the step 1212, the DMF web service application 507 determines if there are more sub-sites at the present level. If this is not so, the process follows a "NO" arrow to the step 1214. If the DMF web service application 507 determines that there are more sub-sites at the present level, the process follows a "YES" arrow from the step 1212 to a step 1213. In the step 1213, the DMF web service application 507 selects the next sub site. The process is then directed back to the step 1209.

Figure 13:
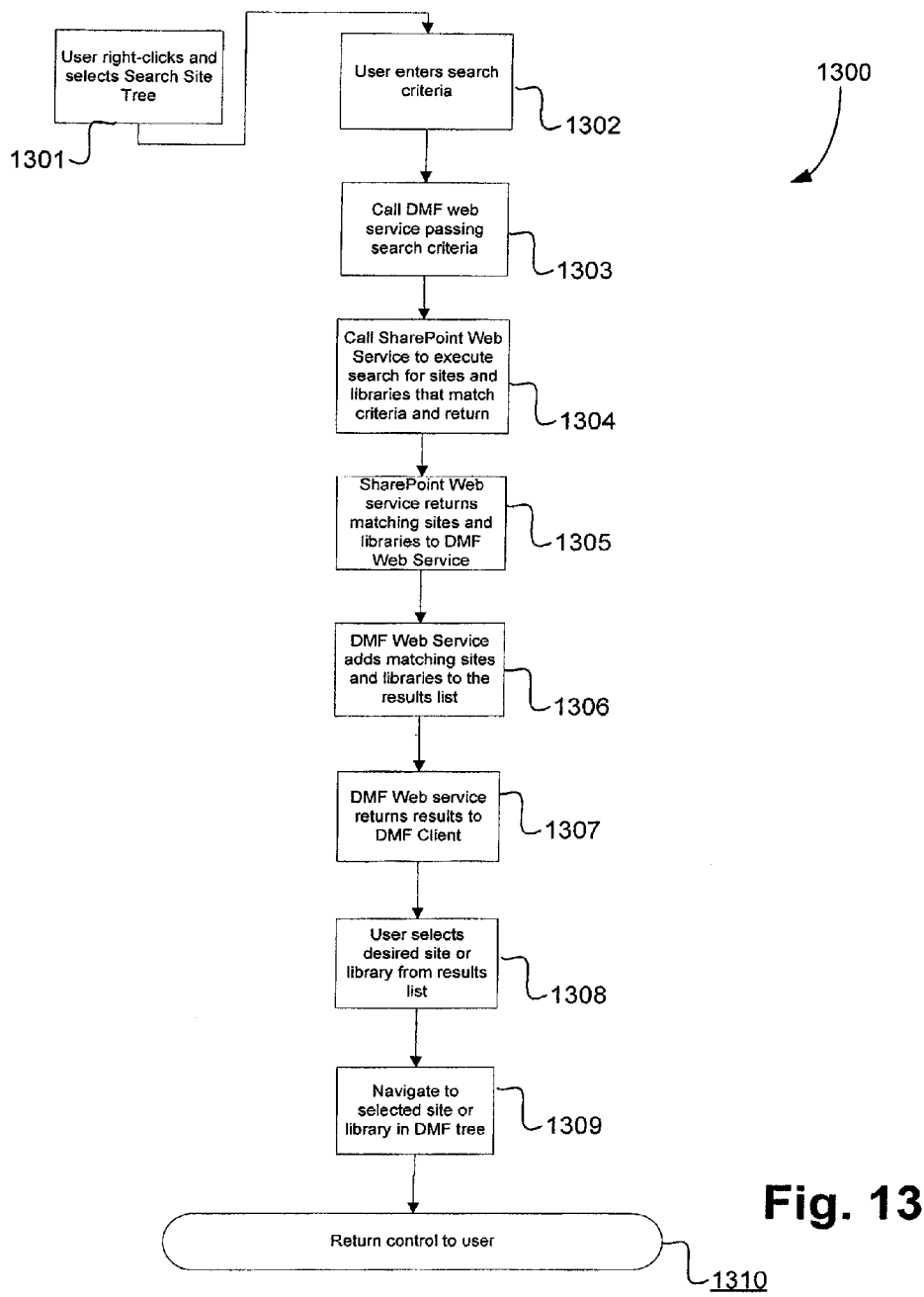
FIG. 13 is a flow chart of a process for displaying sites and libraries that match search criteria.

FIG. 13 is a flow chart showing an example of a process 1300 for searching the site tree and depicts the DMF web service application 507 responding to a request from the DMF Client application 511 for the sites and libraries that match search criteria entered by the user. In a step 1301, the user right-clicks a Target Site in the DMF Pane and selects the Search Site Tree option. In a following step 1302, the user is prompted to enter criteria which will be used to search the SharePoint server 506 by the DMF web service application 507 for a list of sites and libraries that match those criteria to display in the DMF Client application 511. In a following step 1303, the DMF Client application 511 calls the DMF web service application 507 passing the search criteria entered by the user in the step 1302. In a following step 1304, the DMF web service application 507 calls the SharePoint web service application 505 to execute a search for sites and libraries that match the search criteria entered by the user in the step 1302. In a following step 1305, the SharePoint web service application 505 returns a list of the sites and libraries that match the criteria entered by the user in the step 1302 to the DMF web service application 507. In a following step 1306, the DMF web service application 507 adds the sites and libraries returned by the SharePoint web service application 505 to a results list. In a following step 1307, the DMF web service 507 returns this results list to the DMF Client application 511. In a following step 1308, the user selects a desired site or library from the results list returned in step 1307 displayed by the DMF client application 511. In a following step 1309, the DMF Client application 511 navigates to the site or library selected by the user in step 1308 in the DMF Pane 516. In a following step 1310, control returns to the user.

INDUSTRIAL APPLICABILITY

The arrangements described are applicable to the computer and data processing industries and particularly for applications involving accessing information at multiple sites.

The foregoing describes only some embodiments of the present invention, and modifications and/or changes can be made thereto without departing from the scope and spirit of the invention, the embodiments being illustrative and not restrictive.

I claim:

1. A method, in a system comprising a user computer and a SHAREPOINT server communicating over a network, of enabling, using OUTLOOK running on the user computer, document management of files stored by the SHAREPOINT server in a SHAREPOINT tree structure, the method comprising the steps of:

executing an instance of OUTLOOK on the user computer thereby creating an OUTLOOK display window on a display of the user computer;

executing, dependent upon the step of executing the instance of OUTLOOK, a Document Management Framework client application on the user computer;

creating, by the Document Management Framework client application, a Document Management Framework pane in the OUTLOOK display window, said Document Management Framework pane being separate from and additional to panes created by OUTLOOK;

retrieving, by the Document Management Framework client application, a most-recently displayed tree view of the user's SHAREPOINT environment, from a Document Management Framework client side cache;

invoking, by the Document Management Framework client application, a Document Management Framework web service application running on the SHAREPOINT server;

traversing, by the Document Management Framework web service application, in response to a user selection of a target site in said retrieved tree view, the entire SHAREPOINT tree structure commencing at the selected target site and extending to the deepest level of the tree structure, to thereby determine all nodes of the tree structure below the target site, to which the user has access permission, regardless of breaks in inheritance of permission as the tree is traversed;

displaying, in the Document Management Framework pane, in a hierarchical manner all the nodes of the tree structure for which the user either (i) has access permission, or (ii) contain nodes for which the user has access permission;

wherein the displayed nodes are arranged with indentation to reflect nesting, and are displayed using icons that indicate the type of each node in the displayed tree structure.

2. A method according to claim 1, wherein the Document Management Framework client side cache is on the user computer.

3. A method according to claim 1, comprising the further steps of:

receiving information specifying a target node in the updated tree view displayed in the Document Management Framework pane;

determining if the target node is (a) a site collection or a site, or (b) a document library or a folder;

if the target node is a site collection or a site:
 displaying in the Document Management Framework pane sub-site nodes for the target node using the client-side cache or the Document Management Framework web service application;
 if the target node has at least one document library retrieving, from the Document Management Framework web service, details of files and folders in the default view of the document libraries; and
 refreshing the display in the Document Management Framework pane to reflect the retrieved file and folder details; and if the target node is a document library or a folder:
 retrieving, from the Document Management Framework web service, file and folder details in the default view of the document library; and
 refreshing the display in the Document Management Framework pane to reflect the retrieved details.

4. A method according to claim 1, comprising, prior to the traversing step:

recording, for at least one node in the SHAREPOINT tree structure, information determining if said node, or a child node thereof lower down the tree structure, contains a file for which the user has permission;

wherein the traversing step uses information to reduce the processing time required to determine all nodes of the tree structure below the target site, to which the user has access permission.

5. A method according to claim 1, wherein the method comprises, prior to the step of displaying, in the Document Management Framework pane, all the nodes of the tree structure for which the user either (i) has access permission, or (ii) contain nodes for which the user has access permission, a step of:

receiving filter criteria;

wherein the displaying step displays, subject to said filter criteria, sub-sites and libraries in the nodes of the tree structure below the target site, to which the user has access permission.

6. A method according to claim 1, wherein the method comprises, prior to the step of displaying, in the Document Management Framework pane, all the nodes of the tree structure for which the user either (i) has access permission, or (ii) contain nodes for which the user has access permission, a step of:

receiving search criteria;

wherein the displaying step displays, subject to said search criteria, sub-sites and libraries in the nodes of the tree structure below the target site, to which the user has access permission.

7. A document management system, including a user computer and a SHAREPOINT server communicating over a network, for enabling, using OUTLOOK running on the user computer, document management of files stored by the SHAREPOINT server in a SHAREPOINT tree structure, the system comprising:

an OUTLOOK application for executing on the user computer to thereby create an OUTLOOK display window on a display of the user computer;

a Document Management Framework client application for execution on the user computer, for creating a Document Management Framework pane in the OUTLOOK display window; and a Document Management Framework web service application for execution on the SHAREPOINT server, wherein the Document Management Framework client application and the Document Management Framework web service application comprise computer executable for directing processors in the user computer and the SHAREPOINT server to perform a method comprising steps of:

executing an instance of OUTLOOK on the user computer thereby creating an OUTLOOK display window on a display of the user computer;

executing, dependent upon the step of executing the instance of OUTLOOK, a Document Management Framework client application on the user computer;

creating, by the Document Management Framework client application, a Document Management Framework pane in the OUTLOOK display window, said Document Management Framework pane being separate from and additional to panes created by OUTLOOK;

retrieving, by the Document Management Framework client application, a most-recently displayed tree view of the user's SHAREPOINT environment, from a Document Management Framework client side cache;

invoking, by the Document Management Framework client application, a Document Management Framework web service application running on the SHAREPOINT server;

traversing, by the Document Management Framework web service application, in response to a user selection of a target site in said retrieved tree view, the entire SHAREPOINT tree structure commencing at the selected target site and extending to the deepest level of the tree structure, to thereby determine all nodes of the tree structure below the target site, to which the user has access permission, regardless of breaks in inheritance of permission as the tree is traversed;

displaying, in the Document Management Framework pane, in a hierarchical manner all the nodes of the tree structure for which the user either (i) has access permission, or (ii) contain nodes for which the user has access permission;

wherein the displayed nodes are arranged with indentation to reflect nesting, and are displayed using icons that indicate the type of each node in the displayed tree structure.

8. A computer readable storage medium having a non-transitory computer program recorded therein, the program comprising a plurality of computer program modules being executable by a corresponding plurality of interconnected computers comprising a user computer and a SHAREPOINT server communicating over a network, said program configured to make said computers perform a method of enabling, using OUTLOOK running on the user computer, document management of files stored by the SHAREPOINT server in a SHAREPOINT tree structure, the method comprising the steps of:

executing an instance of OUTLOOK on the user computer thereby creating an OUTLOOK display window on a display of the user computer;

executing, dependent upon the step of executing the instance of OUTLOOK, a Document Management Framework client application on the user computer;

creating, by the Document Management Framework client application, a Document Management Framework pane in the OUTLOOK display window, said Document Management Framework pane being separate from and additional to panes created by OUTLOOK;

retrieving, by the Document Management Framework client application, a most-recently displayed tree view of the user's SHAREPOINT environment, from a Document Management Framework client side cache;

invoking, by the Document Management Framework client application, a Document Management Framework web service application running on the SHAREPOINT server;

traversing, by the Document Management Framework web service application, in response to a user selection of a target site in said retrieved tree view, the entire SHAREPOINT tree structure commencing at the selected target site and extending to the deepest level of the tree structure, to thereby determine all nodes of the tree structure below the target site, to which the user has access permission, regardless of breaks in inheritance of permission as the tree is traversed;

displaying, in the Document Management Framework pane, in a hierarchical manner all the nodes of the tree structure for which the user either (i) has access permission, or (ii) contain nodes for which the user has access permission;

wherein the displayed nodes are arranged with indentation to reflect nesting, and are displayed using icons that indicate the type of each node in the displayed tree structure.

9. A document management system, including a user computer and a document store server communicating over a network, for enabling, using a personal information manager software application running on the user computer, document management of files stored by the document store server in a document store tree structure, the system comprising:

the personal information manager software application for executing on the user computer to thereby create a personal information manager software application display window on a display of the user computer;

a Document Management Framework client application for execution on the user computer, for creating a Document Management Framework pane in the personal information manager software application display window; and a Document Management Framework web service application for execution on the document store server;

wherein the Document Management Framework client application and the Document Management Framework web service application comprise computer executable code for directing processors in the user computer and the document store server to perform a method comprising the steps of:

executing an instance of the personal information manager software application on the user computer thereby creating a personal information manager software application display window on a display of the user computer;

executing, dependent upon the step of executing the instance of the personal information manager software application, a Document Management Framework client application on the user computer;

creating, by the Document Management Framework client application, a Document Management Framework pane in the personal information manager software application display window, said Document Management Framework pane being separate from and additional to panes created by the personal information manager software application;

retrieving, by the Document Management Framework client application, a most-recently displayed tree view of the user's document store environment, from a Document Management Framework client side cache;

invoking, by the Document Management Framework client application, a Document Management Framework web service application running on the document store server;

traversing, by the Document Management Framework web service application, in response to a user selection of a target site in said retrieved tree view, the entire document store tree structure commencing at the selected target site and extending to the deepest level of the tree structure, to thereby determine all nodes of the tree structure below the target site, to which the user has access permission, regardless of breaks in inheritance of permission as the tree is traversed; and displaying, in the Document Management Framework pane, in a hierarchical manner all the nodes of the tree structure for which the user either (i) has access permission, or (ii) contain nodes for which the user has access permission;

wherein the displayed nodes are arranged with indentation to reflect nesting, and are displayed using icons that indicate the type of each node in the displayed tree structure.

10. A document management system according to claim 9, wherein the personal information manager software application is an e-mail application.

\* \* \* \* \*